United States Patent [19]

Butcher

[11] Patent Number: 5,987,578
[45] Date of Patent: *Nov. 16, 1999

[54] PIPELINING TO IMPROVE THE INTERFACE OF MEMORY DEVICES

[75] Inventor: Lawrence L. Butcher, Mountain View, Calif.

[73] Assignee: Sun Microsystems, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/673,062

[22] Filed: Jul. 1, 1996

[51] Int. Cl.[6] .............................. G06F 13/16; G06F 12/00
[52] U.S. Cl. ............................................. 711/169; 711/168
[58] Field of Search .................................... 711/169, 168, 711/140, 167

[56] References Cited

U.S. PATENT DOCUMENTS

| | | | |
|---|---|---|---|
| 3,931,613 | 1/1976 | Gruner et al. | 711/169 |
| 4,393,482 | 7/1983 | Yamada | 365/236 |
| 4,445,172 | 4/1984 | Peters et al. | 711/3 |
| 4,677,594 | 6/1987 | Bisotto et al. | 365/219 |
| 4,755,936 | 7/1988 | Stewart et al. | 711/118 |
| 4,901,228 | 2/1990 | Kodama | 714/5 |
| 4,933,909 | 6/1990 | Cushing et al. | 365/230.05 |
| 5,187,783 | 2/1993 | Mansfield et al. | 710/23 |
| 5,222,223 | 6/1993 | Webb, Jr. et al. | 711/140 |
| 5,224,214 | 6/1993 | Rosich | 71/39 |
| 5,257,236 | 10/1993 | Sharp | 365/230.05 |
| 5,261,064 | 11/1993 | Wyland | 711/211 |
| 5,293,623 | 3/1994 | Froniewski et al. | 365/221 |
| 5,367,650 | 11/1994 | Sharangpani et al. | 711/221 |
| 5,469,544 | 11/1995 | Aatresh et al. | 711/169 |
| 5,497,470 | 3/1996 | Liencres | 711/3 |
| 5,526,316 | 6/1996 | Lin | 365/221 |
| 5,534,796 | 7/1996 | Edwards | 326/93 |
| 5,566,124 | 10/1996 | Fudeyasu et al. | 365/230.06 |
| 5,661,692 | 8/1997 | Pinkham et al. | 365/230.05 |
| 5,668,967 | 9/1997 | Olson et al. | 710/22 |
| 5,752,269 | 5/1998 | Divivier et al. | 711/169 |
| 5,870,625 | 2/1999 | Chan et al. | 710/20 |

OTHER PUBLICATIONS

Intel Pentium Processor User's Manual vol. 1: Pentium Processor Data Book; Intel Corp. 1994; pp. 6–30 to 6–34, Dec. 1994.

MC88200 Cache/Memory Management Unit User's Manual (First Edition); Motorola, Inc. 1988; pp. 1–2 and 5–1 to 5–12, Dec. 1988.

*Primary Examiner*—Reginald G. Bragdon
*Attorney, Agent, or Firm*—Blakely Sokoloff Taylor & Zafam

[57] ABSTRACT

Write transactions are conducted by transmitting a first write address from a source device over a first bus on a first clock cycle and transmitting a first data word corresponding to the first write address from the source device over a second bus commencing on a later clock cycle. In order to execute write transactions in this manner, a memory unit is modified to contain a pending write buffer and a memory array. During a write transaction, the address and corresponding data is first stored in the pending write buffer and the data is later transferred into the memory array upon subsequent write transactions. During a read transaction, the read address is compared to the address stored in the pending write buffer. If the read address matches the address stored in the pending write buffer, the corresponding data stored in the pending write buffer is transmitted in response to the read request. If there is no match, corresponding data from the memory array is transmitted.

6 Claims, 4 Drawing Sheets

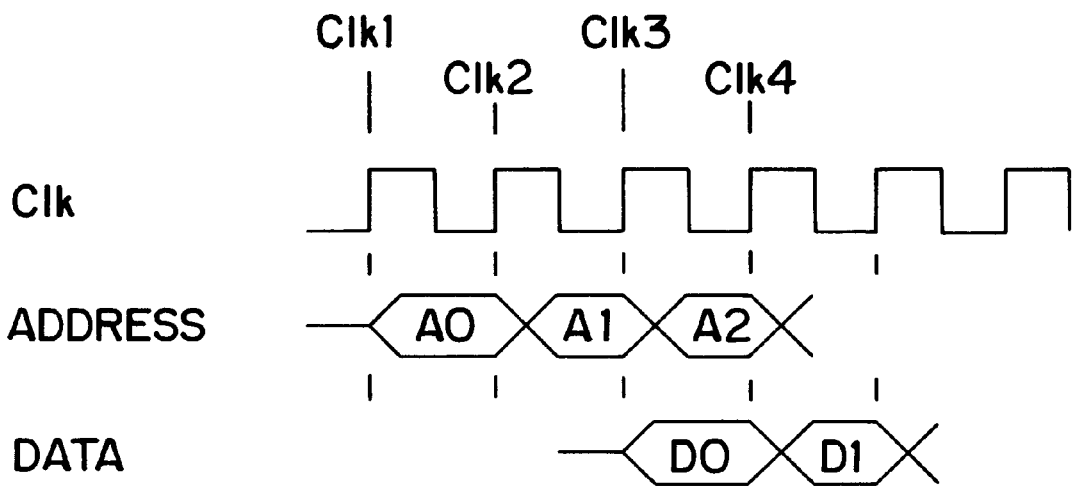
FIG. IA
PRIOR ART
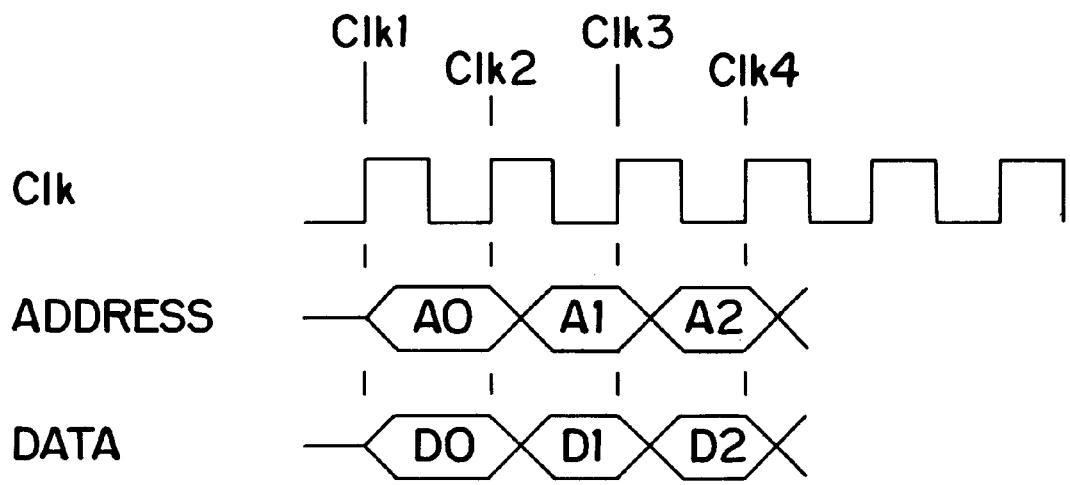
FIG. IB
PRIOR ART

_5,987,578_

PIPELINING TO IMPROVE THE INTERFACE OF MEMORY DEVICES

BACKGROUND OF THE INVENTION

1. Field of the Invention

This invention relates generally to digital data processing systems and more specifically, to a method and apparatus for increasing the speed of memory transactions within a computer system.

2. Background Information

As the computer revolution has progressed, the quest of computer hardware developers has been to develop computer systems exhibiting more processing power and faster performance. In order to increase the speed of computer systems, developers place great emphasis in efficiently using the available clock cycles of the central processing unit (processor) to execute the necessary instructions.

A digital data processing system typically consists of a processor and a memory unit. The memory unit stores data in addressable storage locations, and transfers the appropriate data to and from the processor on a data bus upon request by the processor. The processor issues a read request to the memory unit by transmitting an address over the address bus at one clock cycle. The memory unit receives the address, and commences to transmit the corresponding data to the processor on the next clock cycle. FIG. 1A shows a clock diagram for a read transaction.

A write transaction between the processor and the memory unit is carried out differently. The processor issues a write request by transmitting the address and data on the same clock cycle over the address bus and data bus, respectively. FIG. 1B shows a prior art timing diagram for write transactions.

A sequence of mixed reads and writes cannot run at full speed because each type of transaction makes use of the data bus at different times. For example, in order to issue a write request immediately following a read request, the processor must wait until it receives the read data requested from the memory unit. During this process, at least one available clock cycle is wasted, thus decreasing the overall system performance. In order to issue a read request immediately following a write request, the processor must wait until the write transaction is completed at the memory unit. During this process, one available clock cycle is wasted, again slowing the overall system. Therefore, it would be desirable to have a computer system which makes more efficient use of available clock cycles whenever there is a mixture of read and write transactions.

SUMMARY OF THE INVENTION

According to a first embodiment, a method for improving the interface of memory units is described. Write transactions are transmitted in a manner similar to read transactions by delivering an address on a first clock cycle and data on a next clock cycle. In order to execute write transactions in this manner, the memory unit is modified to contain a pending write buffer and a memory array. For a write transaction, write data is first stored in the pending write buffer and later transferred into the memory array upon subsequent write transactions. The address corresponding to the write data is also stored in the pending write buffer. During a read transaction, the read address is compared to the address associated with the data stored in the pending write buffer. If the read address matches the address stored in the pending write buffer, the corresponding data stored in the pending write buffer is transmitted in response to the read request. If there is no match, corresponding data in the memory array is transmitted.

Other features and advantages of the present invention will be apparent from the accompanying drawings and from the detailed description which follows.

BRIEF DESCRIPTION OF THE DRAWINGS

FIG. 1A shows a clock diagram of read transactions according to the prior art.

FIG. 1B shows a clock diagram of write transactions for a data processing system in accordance with the prior art.

DETAILED DESCRIPTION

The present invention provides a method and apparatus for efficiently executing memory transactions within a digital data processing system. In the following description, numerous specific details are set forth to provide a thorough understanding of the invention. It will be appreciated, however, by one skilled in the art that the present invention may be practiced in a more general application where such advantages provided by this invention are desired.

Referring to FIG. 1A, a clock diagram of read transactions for a prior art digital processing system is shown. A first address packet (A0) is transmitted on a first clock cycle (CLK1), while a corresponding first data packet (D0) is transmitted on a third clock cycle (CLK3). Similarly, a second address packet (A1) is transmitted on CLK2, while a corresponding second data packet (D1) is transmitted on a fourth clock cycle (CLK4). The delay between the transmittal of the address and the transmittal of the data may vary among different memory devices. This delay may also be programmable in certain memory devices.

Referring to FIG. 1B, a clock diagram of write transactions for a prior art digital processing system is shown. A first address packet (A0) and a corresponding first data packet (D0) are transmitted on a first clock cycle (CLK1). Similarly, a second address packet (A1) and a corresponding second data packet (D2) are transmitted on a second clock cycle (CLK2).

It is evident that there are no wasted clock cycles during either a transaction of consecutive reads or consecutive writes. However, a sequence of mixed reads and writes cannot run at full speed without wasting clock cycles. A write request immediately following a read request results in the wasting of at least one available clock cycle. A read request immediately following a write request also results in wasting available clock cycles.

Figure 2:
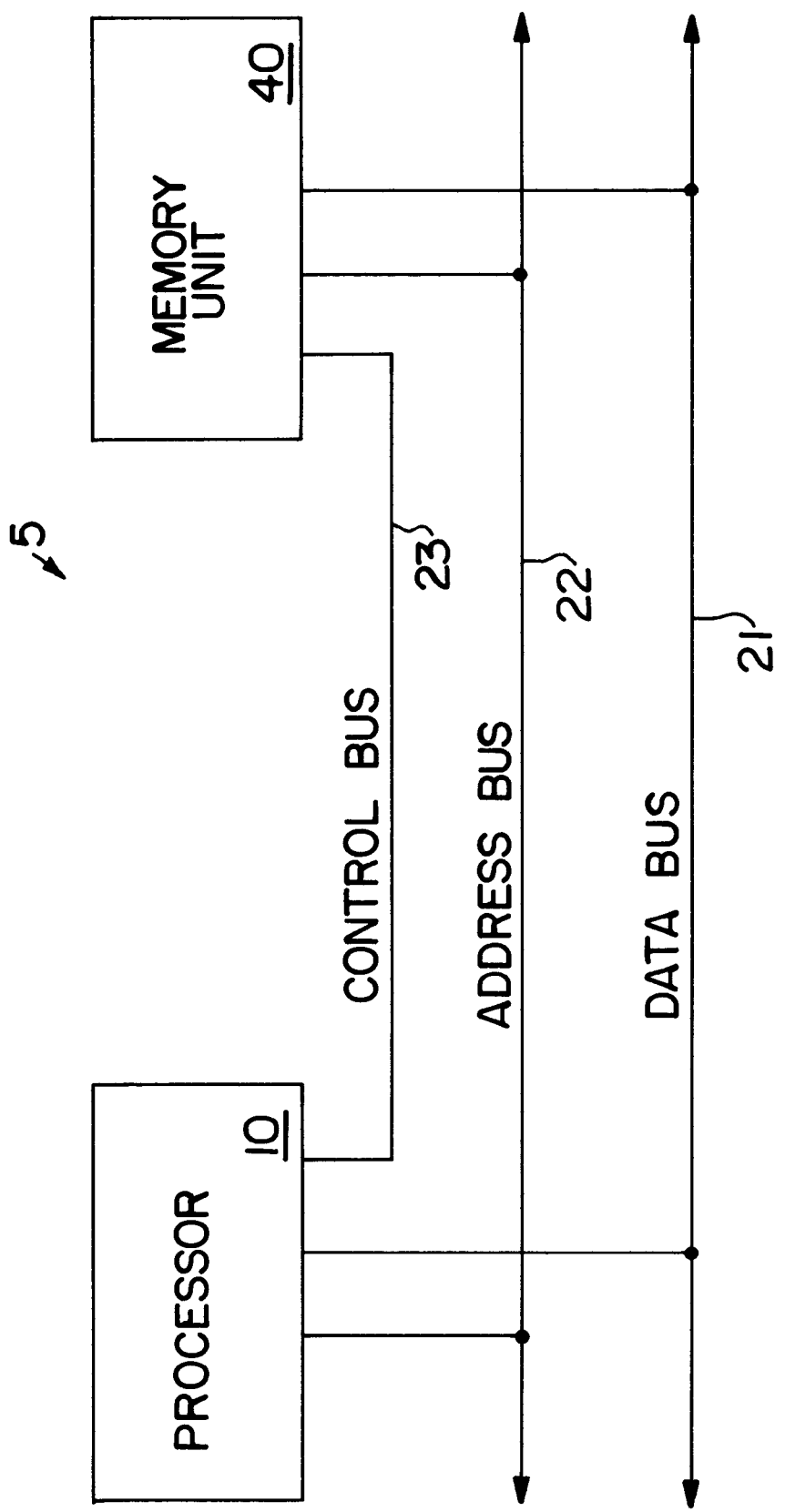
FIG. 2 illustrates an exemplary data processing system utilizing the apparatus and methods of the present invention.

Referring to FIG. 2, an exemplary data processing system 5 which incorporates the apparatus and methods of the present invention is shown. The data processing system 5 comprises a processor 10 and a memory unit 40. The processor 10 and the memory unit 40 are connected by a data bus 21, an address bus 22, and a control bus 23. During a typical data transaction (e.g., a read or a write), the processor 10 transmits a control signal over the control bus 23 to the memory unit 40 on a first clock cycle in order to indicate the direction of the transfer, read or write. At the same time, the processor 10 also transmits an address packet to the memory unit 40 over the address bus 22 in order to indicate which addressable storage location in memory unit 40 is to be accessed. For both read and write transactions, a data packet is transferred between the processor 10 and the memory unit 40 over the data bus 21 on a subsequent clock cycle. During a read transaction, a data packet corresponding to the transmitted address is transferred from the memory unit 40 to the processor 10. During a write transaction, a data packet corresponding to the transmitted address is transferred from the processor 10 to the memory unit 40.

Figure 3A:
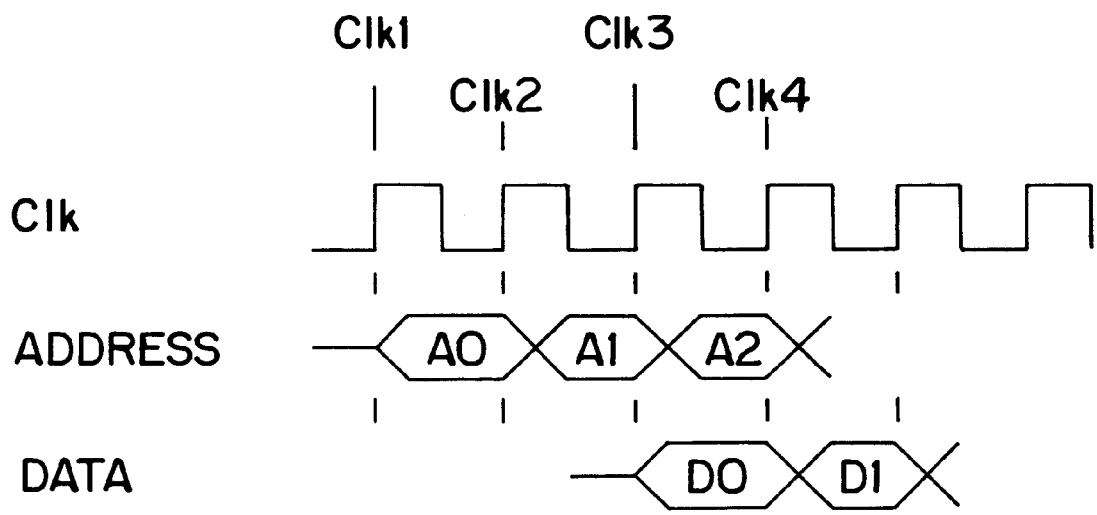
FIG. 3A shows a clock diagram of write transactions in accordance with the present invention.

Referring to FIG. 3A, a clock diagram of write transactions for a preferred embodiment of the digital processing system 5 is shown. A first address packet (A0) is transmitted from the processor 10 to the memory unit 40 on a first clock cycle (CLK1), while a corresponding first data packet (D0) is transmitted on the third clock cycle (CLK3). Similarly, a second address packet (A1) is transmitted on CLK2, while a corresponding second data packet (D1) is transmitted on a fourth clock cycle (CLK4). It is apparent that there are no wasted clock cycles during a transaction of consecutive writes in accordance with the method of the present invention.

Figure 3B:
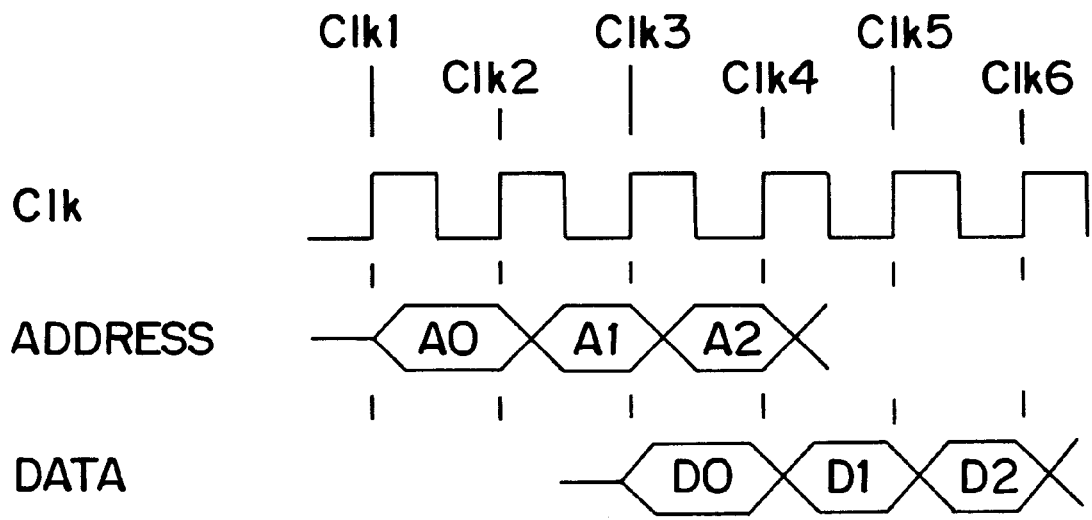
FIG. 3B shows a clock diagram of multiple memory transactions in accordance with the present invention.

Referring to FIG. 3B a clock diagram of multiple memory transactions for the preferred embodiment of the digital processing system 5 is shown. A first write address packet (A0) is transmitted from the processor 10 to the memory unit 40 on a first clock cycle (CLK1), while a corresponding first write data packet (D0) is transmitted on the third clock cycle (CLK3). A first read address packet (A1) is transmitted from the processor 10 to the memory unit 40 on CLK2, while a corresponding first read data packet (D1) is transmitted from the memory unit 40 to the processor 10 on a fourth clock cycle (CLK4). A second write address packet (A2) is transmitted from the processor 10 to the memory unit 40 on CLK3, while a corresponding second write data packet (D2) is transmitted on the fifth clock cycle (CLK5). It is apparent from FIG. 3B that there are no wasted clock cycles during a mixture of read and write transactions. It should be appreciated that although FIG. 3b has been described with reference to a write-read-write mixture of transactions, any set of memory transactions, when performed according to the methods of the present invention, would have a similar clock diagram.

It must be noted that with the mixture of read and write transactions occurring in this manner, there is a potential for interference on the data bus caused by the processor 10 and the memory device 40 driving the data bus at the same time. In order to eliminate the possibility of interference, the data bus may be configured to be open emitter or open collector. Another solution is to turn on the output driver slowly, and to turn it off fast.

Figure 4:
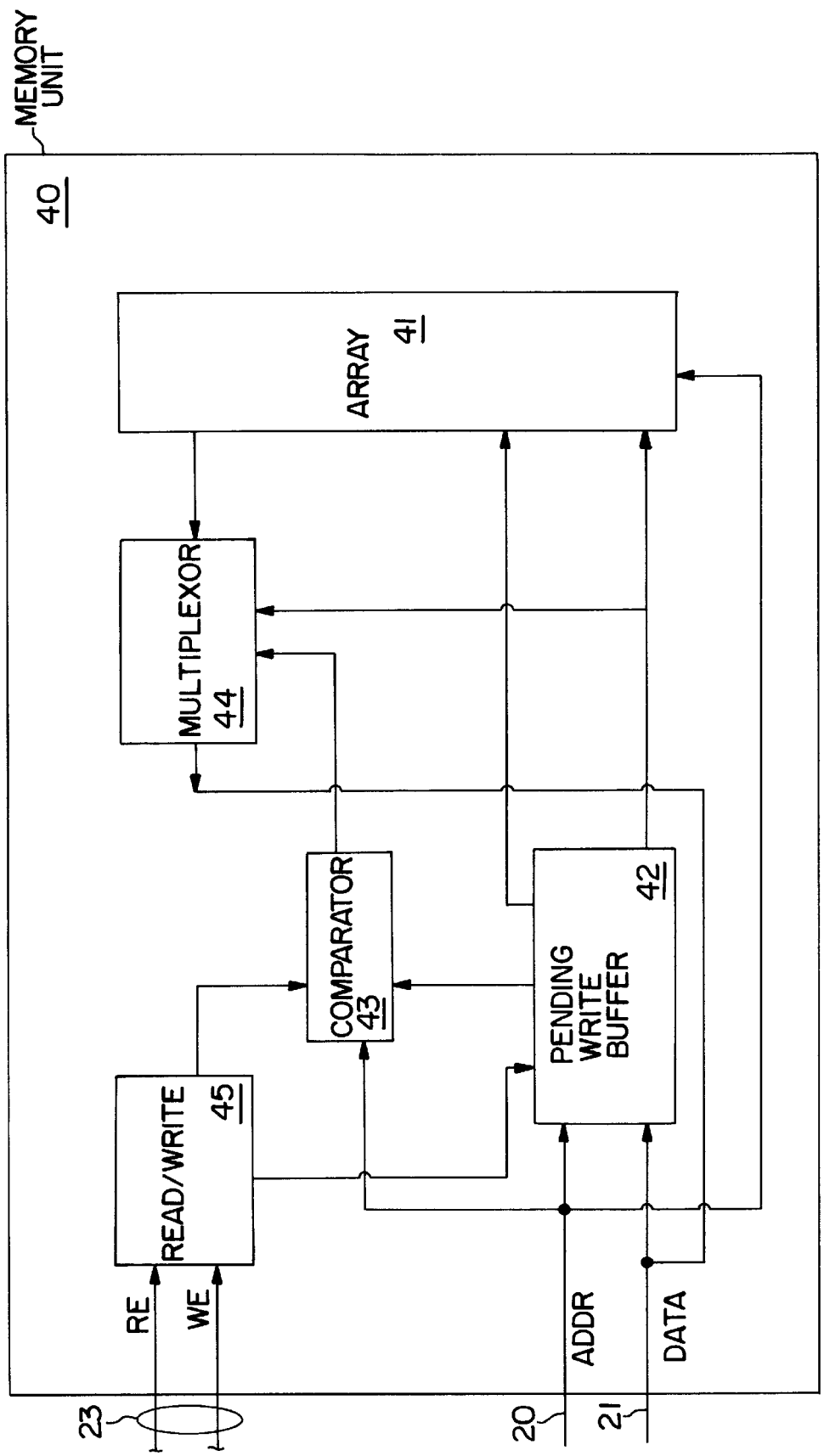
FIG. 4 shows a block diagram of a memory device having a pending write buffer in accordance with the present invention.

FIG. 4 further illustrates memory unit 40. Memory unit 40 comprises an array 41, a pending write buffer 42, a comparator 43, a multiplexer 44, and a read/write control circuit 45. During a first write transaction, a write control signal WE is transmitted over the control bus 23 from the processor 10 to the read/write control circuit 45 on a first clock cycle. The read/write control circuit 45 recognizes the write control signal WE and in response transmits a signal to the pending write buffer 42 indicating a write transaction. Also on the first clock, as illustrated in FIG. 3A, the processor 10 transmits a first address packet to the memory unit 40 over the address bus 22. The address packet is stored in the pending write buffer 42.

On the next clock cycle a first data packet corresponding to the address packet is transmitted from the processor 10 to the memory unit 40 over the data bus 21, and is stored in the pending write buffer 42. Upon a second write transaction, the same sequence of events as described above occurs. However, now in response to the signal from read/write circuit 45 indicating a write transaction, the first data packet is transferred from the pending write buffer 42 to the array 41 and is stored in an address location of the array 41 corresponding to the first address packet. This process repeats for further subsequent write transactions.

If a read transaction occurs after the second write transaction, a control signal RE is transmitted from the processor 10 to the read/write control circuit 45 over the control bus 23. At the same time, a read address packet is transmitted from the processor 10 to the memory device 40 over the address bus 22. The read/write control circuit 45 signals the pending write buffer 42 that a read transaction is in progress. In response, the last write address stored in the pending write buffer 42 is transferred to the comparator 43. Read/Write control circuit 45 also signals the comparator 43 to latch the read address present on address bus 22. Comparator 43 latches the read address packet on address bus 22 and compares the read address packet to the write address obtained from the pending write buffer 42. If the read address packet on the address bus 22 matches the write address from the pending write buffer 42, this indicates that the read is directed to the same address as the last write. Because the write data packet has not been transferred to the array 41 (as no subsequent write transaction has occurred), the write data stored in the pending write buffer 42 must be transferred to the processor 10 in response to the read request. To accomplish this, the multiplexer 44 is signaled by the comparator 43 to select the corresponding data packet stored in the pending write buffer 42. The data packet from the pending write buffer 42 is then transferred to the processor 10 over the data bus 21 on the next clock cycle. However, if the address packet on the address bus 22 does not match the address stored in the pending write buffer 42, the multiplexer 44 is signaled by the comparator 43 to select a data packet from a corresponding storage location in the array 41. The data packet from the array 41 is then transferred to the processor 10 over the data bus 21 on the next clock cycle.

Thus, a method and apparatus for efficiently executing memory transactions within a digital data processing system has been disclosed.

Although the present invention has been described in terms of a preferred embodiment, it will be appreciated that various modifications and alterations might be made by those skilled in the art without departing from the spirit and scope of the invention. For example, the processor 10 of the preferred embodiment may be replaced with any type of device used to access memory. Therefore, the invention should be measured only in terms of the claims which follow.

What is claimed is:

1. A computer assisted method of conducting memory transactions comprising the steps of:

transmitting a first write address from a source device over a first bus on a first clock cycle;

receiving the first write address at a memory device coupled to the source device and storing the first write address in a pending write buffer of the memory device;

transmitting a first data word corresponding to the first write address from the source device over a second bus commencing on a later clock cycle that is two clock cycles after the first clock cycle regardless of whether or not a wait state preceded the later clock cycle;

receiving the first data word at the memory device and storing the first data word in the pending write buffer;

receiving a first read address at the memory device and comparing the first read address to the first write address stored in the pending write buffer;

transmitting first read data corresponding to the first read address from the memory device to the source device by determining whether the first read address corresponds to the first write address and, if so, controlling the output of a multiplexor to provide the first write data as the first read data from the pending write buffer, otherwise controlling the output of the multiplexor to provide the first read data from a memory array of the memory device.

2. The computer assisted method of claim 1 further comprising the step of transmitting a second read address from the source device over the first bus during transmission of the first read data from the memory device over the second bus.

3. The computer assisted method of claim 1 further comprising the step of transmitting a second write address from the source device over the first bus while the read data is being transmitted over the second bus.

4. A computer system comprising:

a memory device having:

a pending write buffer configured to store write address packets received on a first memory bus and write data packets received on a second memory bus;

a memory array coupled to receive write data packets from the pending write buffer;

a control circuit coupled to the pending write buffer and configured to control the transfer of the write data packets from the pending write buffer to the memory array;

a comparator coupled to the pending write buffer and the control circuit and configured to compare write address packets stored in the pending write buffer to read address packets received at the memory device; and a multiplexor coupled to the memory array and the pending write buffer and configured to be under the control of an output signal of the comparator which selects whether data is to be transferred from the memory array or the pending write buffer; and a source device configured to transfer a first write address packet to the memory device over the first memory bus on a first clock cycle, and to transfer write data packets to the memory device over the second memory bus commencing on a subsequent clock cycle that is two clock cycles after the first clock cycle regardless of whether or not a wait state preceded the subsequent clock cycle;

wherein the source device is further configured to transmit a first read address packet to the memory device over the first memory bus on a second clock cycle, and to receive a corresponding read data packet from the memory device on a following clock cycle.

5. The computer system of claim 4, wherein the source device is further configured to transmit a second write address packet or a second read address packet while receiving the read data packet.

6. A memory device comprising:

a pending write buffer configured to store write address packets received on a first memory bus on a first clock cycle and write data packets received on a second memory bus commencing on a subsequent clock cycle that is two clock cycles after the first clock cycle regardless of whether or not a wait state preceded the subsequent clock cycle;

a memory array coupled to receive write data packets from the pending write buffer;

a control circuit coupled to the pending write buffer and configured to control the transfer of the write data packets from the pending write buffer to the memory array;

a comparator coupled to the pending write buffer and the control circuit and configured to compare write address packets stored in the pending write buffer to read address packets received at the memory device; and a multiplexor coupled to the memory array and the pending write buffer and configured to be under the control of an output signal of the comparator which selects whether data is to be transferred from the memory array or the pending write buffer;

wherein the memory device is further configured to receive a first read address packet over the first memory bus on a second clock cycle, and to provide a corresponding read data packet on a following clock cycle.

* * * * *